United States Patent [19]

Shovar

[11] Patent Number: 4,915,447
[45] Date of Patent: Apr. 10, 1990

[54] VEHICLE SEAT WITH ADJUSTABLE THIGH SUPPORT

[75] Inventor: J. Scott Shovar, Davenport, Iowa

[73] Assignee: Sears Manufacturing Company, Davenport, Iowa

[21] Appl. No.: 322,438

[22] Filed: Mar. 13, 1989

[51] Int. Cl.$^4$ ............................................... A47C 7/02
[52] U.S. Cl. ...................................... 297/284; 297/430
[58] Field of Search ............... 297/284, 312, 311, 452, 297/430, 435, 283

[56] References Cited

U.S. PATENT DOCUMENTS

| | | | |
|---|---|---|---|
| 270,724 | 1/1883 | Baldwin | 297/430 X |
| 2,756,809 | 7/1956 | Endresen . | |
| 3,007,738 | 11/1961 | Gardel et al. | 297/430 |
| 3,405,900 | 10/1968 | Robinson . | |
| 3,948,558 | 4/1976 | Obermeier et al. . | |
| 4,018,477 | 4/1977 | Hogan . | |
| 4,153,294 | 5/1979 | Meiller et al. . | |
| 4,165,126 | 8/1973 | Strien et al. | 297/284 |
| 4,324,431 | 4/1982 | Murphy et al. . | |
| 4,334,709 | 6/1982 | Akiyama et al. . | |
| 4,717,203 | 1/1988 | Meiller . | |
| 4,767,155 | 8/1988 | Kousaka et al. | 297/284 X |

FOREIGN PATENT DOCUMENTS

| | | |
|---|---|---|
| 3139945 | 4/1983 | Fed. Rep. of Germany . |
| 3226101 | 1/1984 | Fed. Rep. of Germany . |
| 1560098 | 7/1969 | France . |
| 530315 | 12/1940 | United Kingdom . |
| 1199756 | 7/1970 | United Kingdom . |
| 1220225 | 1/1971 | United Kingdom . |

*Primary Examiner*—Peter A. Aschenbrenner
*Attorney, Agent, or Firm*—Henderson & Sturm

[57] ABSTRACT

This invention provides a vehicle seat with improved adjustments for operators. The seat portion (13) has a front seat pan (31) which slides upon and through a rear seat pan (25) and over seat tilt mechanism whereby the overall length of the seat portion and the angle of the front seat pan with respect to the rear seat pan are selected to provide superior leg support for the vehicle operator.

7 Claims, 5 Drawing Sheets

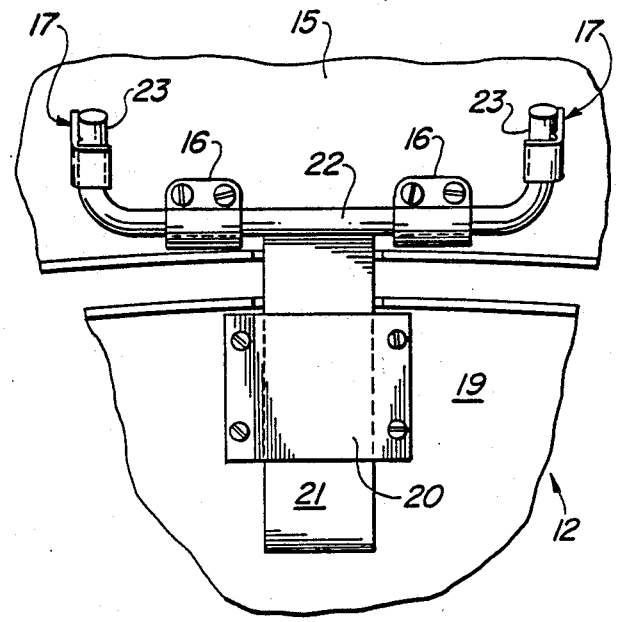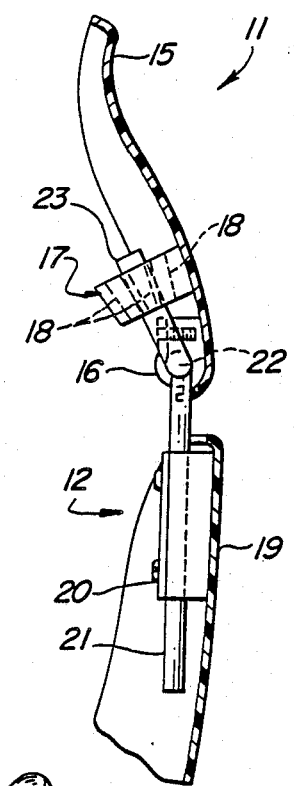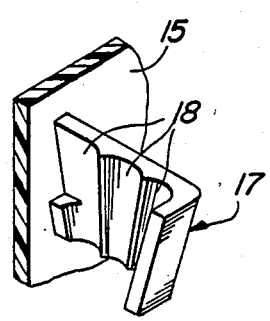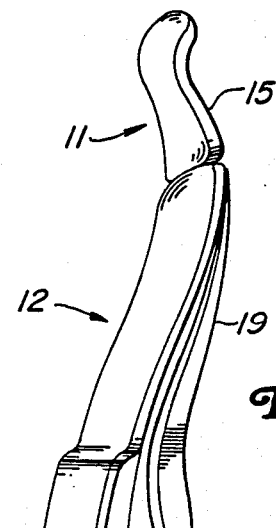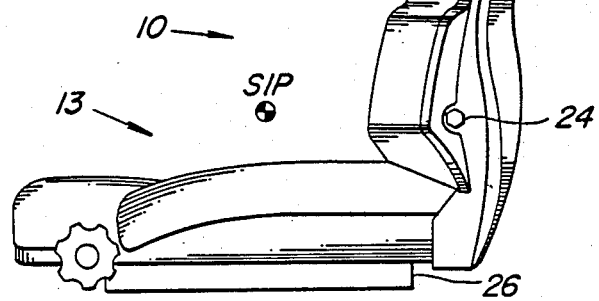

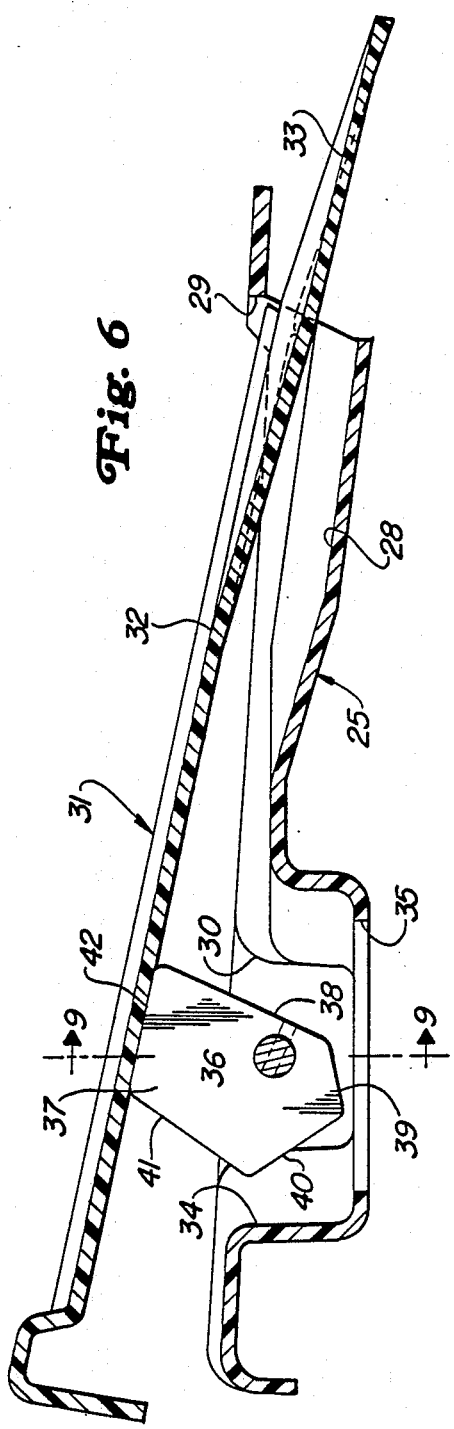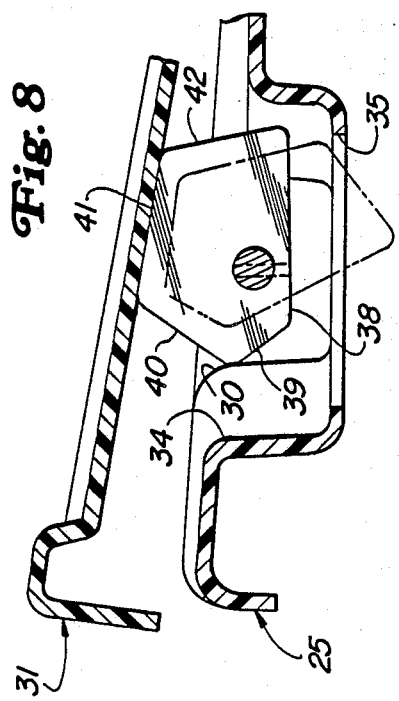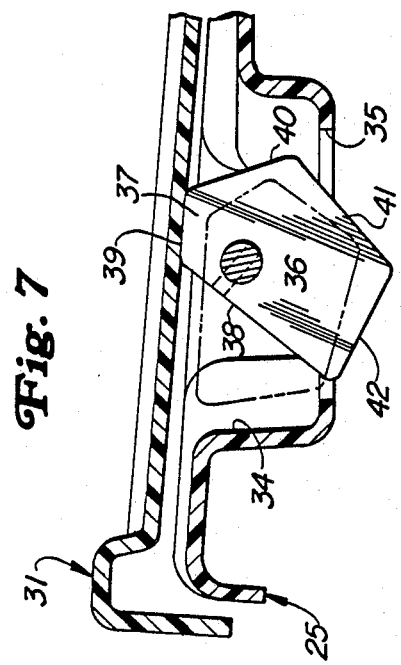

VEHICLE SEAT WITH ADJUSTABLE THIGH SUPPORT

TECHNICAL FIELD

This invention relates generally to vehicle seats. More particularly addressed is modification of such a seat to provide adjustments for better matching the seat to the vehicle operator.

BACKGROUND ART

A condition particularly fatiguing to a vehicle operator occurs when the length of the seat portion of a vehicle seat does not match the length of the operator's upper legs or thighs. The front edge of the seat in particular can engage the back of the operator's thighs too far above the knees, or can engage the operator's legs below the knees, at the back of the calves. In the former case, although the operator can engage any foot controls freely, the relative lack of leg support is fatiguing. In the latter case, proper engagement of foot controls can be hampered.

DISCLOSURE OF INVENTION

Responding to the needs described above, this invention provides a vehicle seat having a two-part seat portion. A rearward seat portion part is fixed and supports a pivotally attached backrest. The forward seat portion slidably engages the rearward seat portion and is movable to adjust the overall length of the seat portion. Furthermore, the forward seat portion slides over a tilting mechanism operable to pivot the forward seat portion with respect to the rear seat portion. Additionally, an adjustable upper backrest or headrest part is attached to the backrest for proper head support once other adjustments have been made.

It is a general object of this invention to provide an improved vehicle seat.

A more particular object of this invention is provision of a vehicle seat which more effectively supports the vehicle operator.

Another object is improved support for the vehicle operator's legs in general and thighs in particular.

Yet another object is provision of vehicle operator leg support while maintaining proper access to vehicle foot controls.

A further object of this invention is to better match the backrest and forward seat portion pivoting points to the hip pivot point of the vehicle operator, thereby better matching seat adjustment functions with natural bending motions of the operator.

Also an object is provision of additional adjustment features, such as for the vehicle operator's head, which can be made to complement desirable leg support adjustments.

These objects and other features and advantages of this invention will become readily apparent upon referring to the following description in conjunction with the drawings.

BRIEF DESCRIPTION OF THE DRAWINGS

This invention of a vehicle seat with adjustable thigh support is illustrated in the drawings wherein:

FIG. 2 is a side elevational view of the assembled vehicle seat;

FIG. 3 is an enlarged, fragmentary, partially sectional side elevation showing headrest structures;

FIG. 4 is an enlarged, fragmentary front elevation showing headrest structures;

FIG. 5 is an enlarged, fragmentary perspective view of the headrest articulation detents;

FIG. 6 is an enlarged, fragmentary, partially sectional side elevation showing articulation of the front and rear seat pans;

FIG. 7 is an enlarged, fragmentary, partially sectional side elevation indicating operation of the seat tilt cams;

FIG. 8 is an enlarged, fragmentary, partially sectional side elevation indicating another position of the seat tilt cams;

BEST MODE FOR CARRYING OUT THE INVENTION

Figure 1:
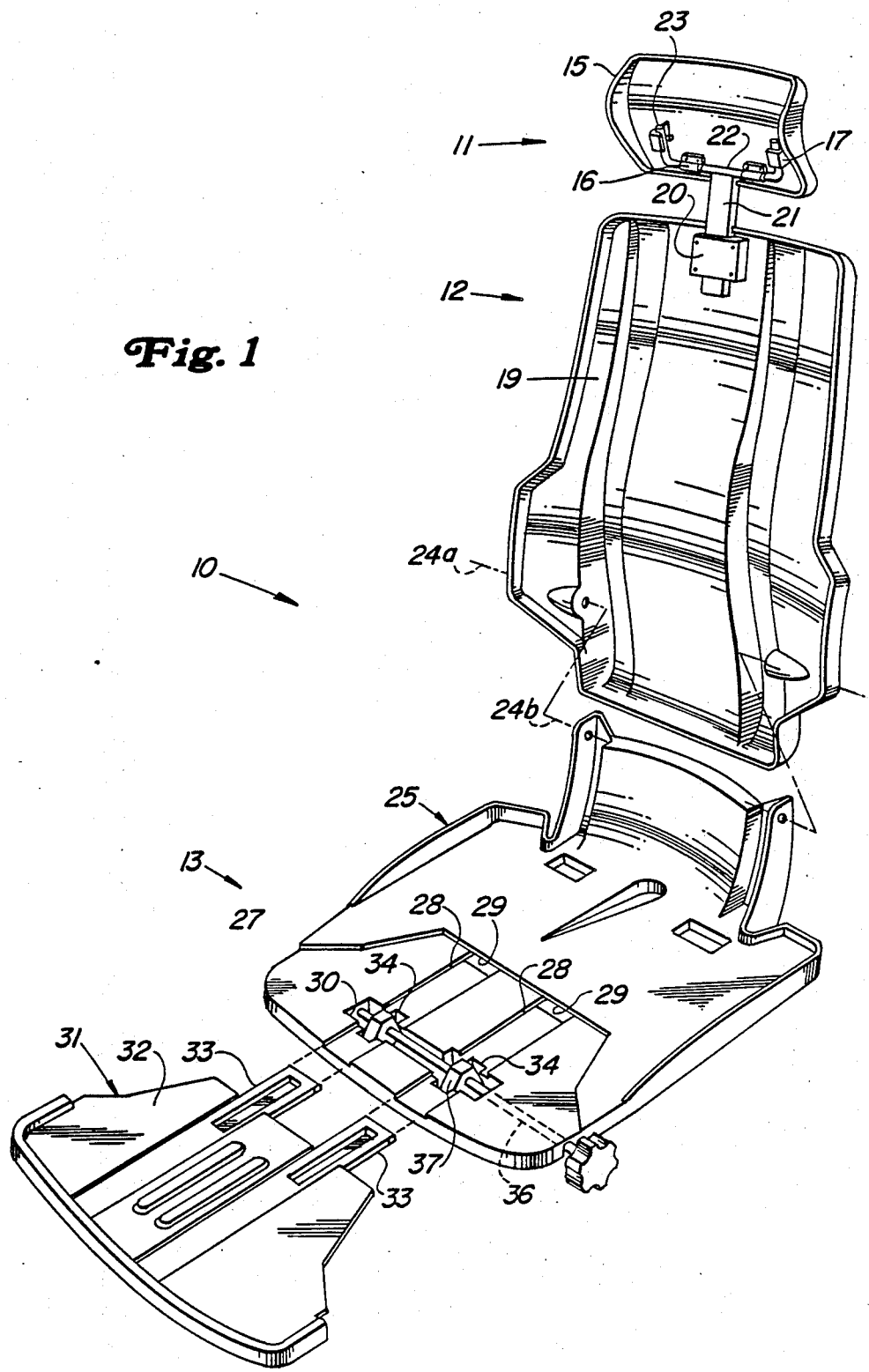
FIG. 1 is an exploded, perspective view of the vehicle seat, the foam and upholstery removed to reveal structural features thereof.
Figure 9:
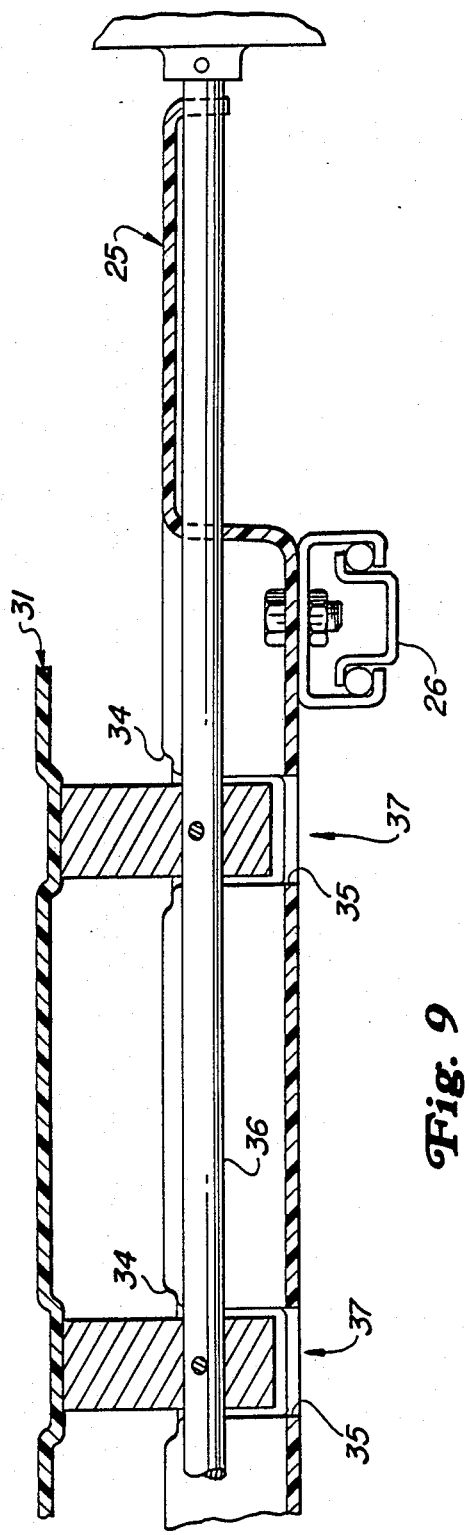
FIG. 9 is an enlarged, fragmentary sectional view taken along line 9—9 of FIG. 6.

The vehicle seat is shown generally at (10) in FIG. 1. The vehicle seat (10) more particularly includes a headrest (11), backrest (12), and seat portion (13).

The headrest (11) includes an upper back pan (15) which supports the usual foam with upholstery covering. Joined adjacent the lower edge of the pan (15) are transversely spaced and aligned sleeve-forming members (16). Attached to the pan (15) upwardly from the sleeve (16) are a pair of transversely spaced articulation detents (17). Each detent (17) includes a plurality of depressions (18), the long axes of which when viewed from the side converge back at the sleeve (16).

The backrest (12) includes a back pan (19) covered by the usual foam and upholstery. An upper back mounting bracket (20) extends from pan (19) adjacent the upper end of the backrest (12). An upper back support (21) moves within the bracket (20). A transverse rod part (22) is fixed normal to the upper end of support (21), and parallel spaced apart uprights (23) extend from each end of rod (22). The sleeves (16) capture and rotate upon rod part (22) thereby allowing the headrest (11) to pivot with respect to backrest (12). The uprights (23) engage the depressions (18) of detent (17) to hold the headrest (11) fixed with respect to backrest (12), and the detents (17) are flexible enough to permit movement of the uprights (23) to positions within different pairs of depressions (18). Pivot attachment points (24a) are formed through pan (19) adjacent the lower end thereof.

The seat portion (13) includes a rear seat pan (25) which is covered generally by the usual foam and upholstery. The backrest (12) is pivotally attached at a point (24b) elevated from the rear edge of pan (25). The resulting pivot point (24) is disposed at an elevation above rear seat pan (25) substantially the height of the vehicle operator hip pivot point.

The pan (25) itself bears the conventional slide set (26) or the like coupling the seat (10) to the vehicle. The pan (25) further includes a forward area (27) not covered by foam. Transversely spaced apart, longitudinally elongated grooves or depressions (28) are formed into this area (27). Slots (29) are formed through pan (25) at the rear ends of the grooves (28) and are disposed generally below the vehicle operator hip pivot point (SIP). A transversely oriented, deeper groove (30) is formed into pan (25) adjacent the front part of area (27).

The seat portion (13) also includes a front seat pan (31) covered by foam and upholstery. Pan (31) has a rear area (32) which generally rests upon forward area (27). Transversely spaced runners or guides (33) extend rearwardly from area (32) and slidably fit within grooves (28) and through slots (29).

A seat tilt mechanism includes enlarged areas (34) at the intersection of grooves (28) and (30), and openings (35) communicating with the areas (34). The rear seat pan (25), adjacent the front end thereof, bears a transverse support shaft (36) which is rotatable about its long axis and which extends within groove (30). A pair of seat tilt cams (37) are fixed to, and rotate with shaft (36). The cams (37) have several flattened peripheral areas (38), (39), (40), (41), (42) disposed successively farther away from shaft (36).

Figure 10:
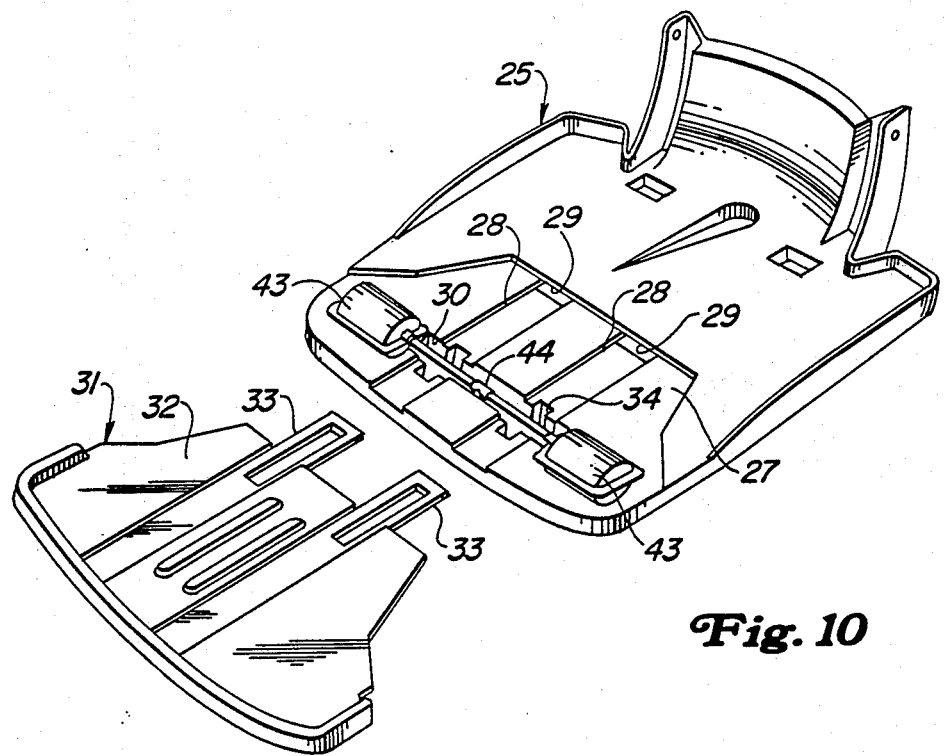
FIG. 10 is an exploded, perspective view of the front and rear seat pans showing an alternate embodiment of this invention.
Figure 11:
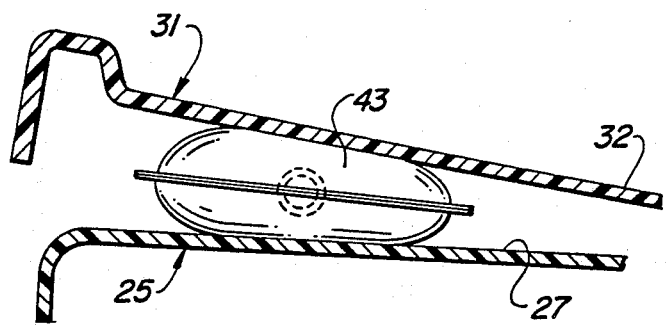
FIG. 11 is an enlarged, fragmentary, partially sectional side elevation showing alternate seat tilting structure.

An alternate seat tilt mechanism is shown in Figs. 10 and 11. A pair of air bags (43) are attached to forward area (27) and coupled by tubing (44) to a standard air supply (not shown).

The front seat pan (31) rests upon, and slides over, the cams (37) or the bags (43).

The operator grasps the front edge of the front seat pan (31) and pulls or pushes as desired to fit the overall length of seat portion (13) to the operator's legs. The operator rotates shaft (36), selecting which of areas (38), (39), (40), (41), (42) the front seat pan (31) will rest upon, thereby setting the front seat (31) with respect to the rear seat pan (25) at the angle preferred for support. In the alternative, the operator actuates the air supply to inflate or deflate the bags (43). The operator grasps, and pulls or pushes the headrest (11), causing it to pivot about rod (22) and the uprights (23) to engage the ribs (18) which secure the headrest (11) at the desired angle for support.

The industrial applicability of this seat invention is believed to be apparent from the foregoing description. Although a preferred embodiment has been disclosed herein, it is to be remembered that various alternate constructions can be made thereto without departing from the scope of this invention.

We claim:

1. A vehicle seat comprising:
   a backrest means;
   seat means coupled to said backrest means and including a first seat part joined to the vehicle and a second seat part slidable with respect to said first seat part to vary the overall length of said seat means;
   said first seat part having groove means therein and said second seat part having runner means which slidably engage said groove means;
   said first seat part including a first seat pan, said groove means including a plurality of elongated depressions in said first seat pan and having at one end thereof slots formed through said first seat pan, said runner means being slidable in said depressions and through said slots to extend beneath said first seat pan; and
   seat tilt means, said second seat part being slidable over said seat tilt means and pivotable with respect to said first seat part upon actuation of said seat tilt means.

2. The vehicle seat of claim 1 wherein said seat tilt means includes cam means, a plurality of peripheral surface areas formed on said cam means, said surface areas being selectively engageable with the underside of said second seat part upon rotation of said cam means.

3. The vehicle seat of claim 2 and further wherein said backrest means includes an upright means, headrest means pivotally attached to said upright means at a first location, headrest means having detent means disposed at a second location selectively engageable by said upright means.

4. The vehicle seat of claim 1 wherein said seat tilt means includes air bag means fixed to said first seat part.

5. A vehicle seat comprising:
   backrest means;
   seat means coupled to said backrest means and including first and second seat parts, said first seat part including groove means, said second seat part including runner means which pivotally engage said groove means; and
   seat tilt means connected to the vehicle for selective engagement of the underside of said second seat part, whereby said second seat part is pivoted with respect to said first seat part, said seat tilt means including cam means having a plurality of peripheral surface areas thereon, said surface areas being selectively engageable with the underside of said second seat part upon positioning of said cam means.

6. The vehicle seat of claim 5 wherein said seat tilt means includes rotatable shaft means mounted in said first seat part, said cam means being fixed to said shaft means, said seat means being disposed upon said base.

7. A vehicle seat comprising:
   backrest means;
   seat means coupled to said backrest means and including first and second seat parts, said first seat part including groove means, said second seat part including runner means which pivotally engage said groove means; and
   seat tilt means connected to the vehicle for selective engagement of the underside of said second seat part, whereby said second seat part is pivoted with respect to said first seat part, said seat tilt means including air bag means fixed to said first seat part.

* * * * *